(12) United States Patent
Jeong et al.

(10) Patent No.: US 10,850,239 B2
(45) Date of Patent: Dec. 1, 2020

(54) FILTER MEDIUM, METHOD FOR MANUFACTURING SAME, AND FILTER MODULE COMPRISING SAME

(71) Applicant: AMOGREENTECH CO., LTD., Gyeonggi-do (KR)

(72) Inventors: Ui Young Jeong, Incheon (KR); In Yong Seo, Seoul (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 88 days.

(21) Appl. No.: 16/306,000

(22) PCT Filed: Jun. 1, 2017

(86) PCT No.: PCT/KR2017/005735
§ 371 (c)(1),
(2) Date: Nov. 30, 2018

(87) PCT Pub. No.: WO2017/209536
PCT Pub. Date: Dec. 7, 2017

(65) Prior Publication Data
US 2019/0176095 A1     Jun. 13, 2019

(30) Foreign Application Priority Data
Jun. 2, 2016   (KR) .......................... 10-2016-0069040

(51) Int. Cl.
*B01D 69/02*   (2006.01)
*B01D 63/08*   (2006.01)
(Continued)

(52) U.S. Cl.
CPC ......... *B01D 69/02* (2013.01); *B01D 39/1623* (2013.01); *B01D 63/067* (2013.01);
(Continued)

(58) Field of Classification Search
CPC ........ B01D 69/02; B01D 69/10; B01D 39/16; B01D 39/1623
See application file for complete search history.

(56) References Cited

U.S. PATENT DOCUMENTS

| 8,672,142 B2 * | 3/2014 | Nishiyama ............. | B01D 65/08 210/500.25 |
| 2008/0149561 A1 * | 6/2008 | Chu ....................... | B01D 69/10 210/500.38 |

(Continued)

FOREIGN PATENT DOCUMENTS

| JP | 08-510796 A | 11/1996 |
| JP | 2004-332138 A | 11/2004 |

(Continued)

OTHER PUBLICATIONS

International Search Report cited in PCT/KR2017/005735 dated Oct. 31, 2017, 3 pages.

*Primary Examiner* — Ellen M McAvoy
(74) *Attorney, Agent, or Firm* — Rothwell, Figg, Ersnt & Manbeck, P.C.

(57) ABSTRACT

A filter medium is provided. A filter medium according to an embodiment of the present invention comprises: a fiber web layer of a three-dimensional network structure including nanofiber; and a hydrophilic coating layer which covers at least a part of the outer surface of the nanofiber. According to this, a flow rate can be remarkably increased due to the improved hydrophilicity of the filter medium. Also, as the improved hydrophilicity is maintained for a long period of time, the lifespan can be remarkably prolonged. Furthermore, since the modification of a porous structure of the filter medium is minimized during the process of hydrophilization so that the initially designed physical properties of the filter medium can be exhibited in its entirety, the filter medium having chemical resistance, excellent water perme- (Continued)

ability and durability can be variously applied in the water treatment field.

20 Claims, 7 Drawing Sheets (51) Int. Cl.
B01D 71/34 (2006.01)
D04H 1/4318 (2012.01)
D04H 1/728 (2012.01)
B01D 71/32 (2006.01)
D04H 1/64 (2012.01)
B01D 63/06 (2006.01)
D04H 1/587 (2012.01)
B01D 39/16 (2006.01)
D04H 1/54 (2012.01)
D01F 8/00 (2006.01)
B01D 69/10 (2006.01)
B01D 67/00 (2006.01)
B01D 71/38 (2006.01)
D01D 5/00 (2006.01)
D01F 6/12 (2006.01)
D01F 8/06 (2006.01)
D04H 1/558 (2012.01)
D06M 15/333 (2006.01)
D06M 101/26 (2006.01)

(52) U.S. Cl.
CPC ......... *B01D 63/08* (2013.01); *B01D 67/0002* (2013.01); *B01D 67/0088* (2013.01); *B01D 69/10* (2013.01); *B01D 71/32* (2013.01); *B01D 71/34* (2013.01); *B01D 71/38* (2013.01); *D01D 5/003* (2013.01); *D01D 5/0084* (2013.01); *D01F 6/12* (2013.01); *D01F 8/00* (2013.01); *D01F 8/06* (2013.01); *D04H 1/4318* (2013.01); *D04H 1/54* (2013.01); *D04H 1/558* (2013.01); *D04H 1/587* (2013.01); *D04H 1/64* (2013.01); *D04H 1/728* (2013.01); *D06M 15/333* (2013.01); *B01D 2239/025* (2013.01); *B01D 2239/0421* (2013.01); *B01D 2239/065* (2013.01); *B01D 2239/0654* (2013.01); *B01D 2239/1208* (2013.01); *B01D 2239/1233* (2013.01); *B01D 2323/02* (2013.01); *B01D 2323/30* (2013.01); *B01D 2323/39* (2013.01); *B01D 2325/02* (2013.01); *B01D 2325/36* (2013.01); *D06M 2101/26* (2013.01); *D10B 2321/021* (2013.01); *D10B 2321/022* (2013.01); *D10B 2401/021* (2013.01); *D10B 2401/022* (2013.01); *D10B 2505/04* (2013.01)

(56) References Cited

U.S. PATENT DOCUMENTS

| | | | | |
|---|---|---|---|---|
| 2012/0137885 | A1* | 6/2012 | Dullaert | D01D 5/0038 96/12 |
| 2018/0236403 | A1* | 8/2018 | Jeong | B01D 71/42 |
| 2019/0366249 | A1* | 12/2019 | Seo | B01D 39/1623 |
| 2020/0016545 | A1* | 1/2020 | Seo | B32B 5/022 |
| 2020/0078742 | A1* | 3/2020 | Seo | B01D 63/08 |

FOREIGN PATENT DOCUMENTS

| | | |
|---|---|---|
| JP | 2007-505662 A | 3/2007 |
| JP | 2013-534462 A | 9/2013 |
| KR | 10-2009-0029845 A | 3/2009 |

* cited by examiner

FILTER MEDIUM, METHOD FOR MANUFACTURING SAME, AND FILTER MODULE COMPRISING SAME

CROSS REFERENCE TO RELATED APPLICATION

This application is a 35 U.S.C. 371 National Phase Entry Application from PCT/KR2017/005735, filed Jun. 1, 2017, which claims the benefit of Korean Patent Application No. 10-2016-0069040 filed on Jun. 2, 2016, the disclosures of which are incorporated herein in their entirety by reference.

TECHNICAL FIELD

The present invention relates to a filter medium, and more specifically, to a filter medium which has high water permeability as well as high durability, a method of manufacturing the filter medium, and a filter module including the filter medium.

BACKGROUND ART

Separation membranes may be classified into microfiltration (MF) membranes, ultrafiltration (UF) membranes, nanofiltration (NF) membranes, and reverse osmosis (RO) membranes according to a pore size.

Although the above-exemplified separation membranes differ in usages and pore sizes, the separation membranes have a common feature of being filtration media composed of a fiber or porous polymer filtration media or having the form of a composite membrane thereof.

Generally, the porous polymer filtration media are prepared through a method of forming pores in a polymer membrane or a polymer hollow fiber using a separate pore-forming agent contained in a solution by sintering the pore-forming agent or dissolving the pore-forming agent in an external coagulating solution. On the other hand, the filtration media composed of the fiber are generally prepared by accumulating produced short fibers and then applying heat, pressure, or the like thereto, or by spinning the short fibers and concurrently applying heat, pressure, or the like thereto.

A typical example of the filtration media composed of the fiber is a nonwoven fabric. In general, pores of the nonwoven fabric are controlled by a diameter of a short fiber, a basis weight of a medium, and the like. However, since a diameter of a short fiber included in a general nonwoven fabric is in the unit of microns, there is a limitation in implementing a separation membrane having a fine and uniform pore structure only by controlling a diameter and basis weight of a fiber. Accordingly, only a separation membrane such as a microfiltration membrane may be implemented using a general nonwoven fabric, and it is difficult to implement a separation medium such as an ultrafiltration membrane or a nanofiltration membrane for filtering finer particles.

A method designed to solve the problem is to use a separation membrane composed of a microfiber having a nanoscale fiber diameter. However, it is difficult to prepare a microfiber having a nanoscale diameter by spinning only once through a general fiber pinning process such as a wet spinning process, and it is necessary to spin sea-island yarn or the like and separately elute a sea component to obtain an island component which is a microfiber, and thus there are problems of inconvenience, a cost increase, extension of production time. Accordingly, recently, there has been a tendency to directly spin a fiber having a nanoscale diameter through electro spinning and produce a large number of filtration media composed of from the fiber.

On the other hand, one of physical properties suitable for water treatment application is flux, which is influenced by the degree of hydrophilicity of a material of a separation membrane as well as the porosity, pore size, and pore structure of the separation membrane. In the case of a separation membrane made of a material having low hydrophilicity, flux is improved through a method such as plasma treatment, surface modification with a hydrophilic group, being coated with a separate hydrophilic layer, or the like.

However, when a material of a separation membrane has high hydrophobicity, permeability of a coating composition such as water is not high. When a hydrophobic separation membrane is modified so as to have improved hydrophilicity, flux may not be increased to a desired level. The hydrophilicity of the modified separation membrane may be easily lost during a water treatment. Thus, it is difficult to continuously exhibit initial flux.

In addition, an initially designed pore structure of a separation membrane may be changed porosity and a pore size in a hydrophilizing process in order to achieve desired flux and separation efficiency, and thus, initially designed levels of flux and separation efficiency may not be exhibited.

Accordingly, there is an urgent need to develop a separation membrane in which hydrophilicity of the separation membrane may be improved to considerably increase flux and minimize a change in pore structure of the separation membrane itself, and hydrophilicity may be maintained for a long period of time due to durability.

Technical Solution

The present invention has been made in consideration of the above-mentioned actual circumstances and is directed to providing a filter medium in which hydrophilicity of a separation membrane is improved to considerably increase flux, and a method of manufacturing the same.

In addition, the present invention is directed to providing a filter medium in which hydrophilicity is maintained for a long period of time and thus a use cycle is considerably increased, and a method of manufacturing the same.

Furthermore, the present invention is directed to providing a filter medium in which a change in pore structure of a medium is minimized in a hydrophilizing process to fully exhibit initially designed physical properties of the medium, and a method of manufacturing the same.

In addition, the present invention is directed to providing a filter module which is variously applicable in a water treatment field through a filter medium having chemical resistance, high water permeability, and high durability.

In order to solve the above problems, the present invention provides a filter medium including: a fiber web layer which has a three-dimensional network structure including a nanofiber; and a hydrophilic coating layer which covers at least a portion of an outer surface of the nanofiber.

According to an exemplary embodiment of the present invention, the filter medium may further include a support body disposed on at least one surface of the fiber web layer. The support body may include at least one selected from a nonwoven fabric, a fabric, and a knitted fabric.

The support body may include a composite fiber which includes a support component and a low melting point component and is disposed such that at least a portion of the low melting point component is exposed at an outer surface thereof, and the low melting point component of the composite fiber may be thermally fused to a fiber web.

The nanofiber may include at least one fluorine-based compound selected from the group consisting of polytetrafluoroethylene (PTFE)-based, tetrafluoroethylene-perfluoroalkyl vinyl ether (PFA) copolymer-based, tetrafluoroethylene-hexafluoropropylene (FEP) copolymer-based, tetrafluoroethylene-hexafluoropropylene-perfluoroalkyl vinyl ether copolymer (EPE)-based, tetrafluoroethylene-ethylene (ETFE) copolymer-based, polychlorotrifluoroethylene (PCTFE)-based, chlorotrifluoroethylene-ethylene (ECTFE) copolymer-based, and polyvinylidene fluoride (PVDF)-based compounds.

The fiber web layer may have an average pore size of 0.1 μm to 5 μm and a porosity of 40% to 90%.

The nanofiber may have a diameter of 0.05 μm to 2 μm.

The hydrophilic coating layer may be formed by cross-linking a hydrophilic polymer compound including a hydroxy group and a cross-linking agent including a carboxyl group. The hydrophilic polymer compound including the hydroxy group may be polyvinyl alcohol having a weight average molecular weight of 20,000 to 100,000 and a saponification degree of 85% to 90%. The cross-linking agent may include at least three carboxyl groups.

The hydrophilic polymer compound may be polyvinyl alcohol and may include 5 to 20 parts by weight of the cross-linking agent with respect to 100 parts by weight of the polyvinyl alcohol.

The fluorine-based compound may be a PVDF-based compound having a weight average molecular weight of 300,000 to 600,000

The hydrophilic coating layer may cover the nanofiber so as to be included in an amount of 0.1 g to 2 g per unit area ($m^2$) of a fiber web layer.

The cross-linking agent may include at least one material selected from the group consisting of poly(acrylic acid-maleic acid), a polyacrylic acid, and poly(styrenesulfonic acid-maleic acid).

An average initial wetting angle may be less than or equal to 40° and an average deviation of an initial wetting angle may be less than or equal to 7° at any five different points on an exposed surface of the fiber web layer.

The present invention provides a method of manufacturing a filter medium, the method including: (1) forming a fiber web layer with a three-dimensional network structure including a nanofiber; and (2) forming a hydrophilic coating layer by treating the fiber web layer with a hydrophilic coating composition.

The fiber web layer of step (1) may be formed by electro spinning a spinning solution on a support body.

Step (1) may further include thermally fusing the support body and the fiber web layer by applying any one or more of heat and pressure to the stacked support body and fiber web layer.

The hydrophilic coating composition may include polyvinyl alcohol (PVA) as a hydrophilic polymer compound and may include 5 to 20 parts by weight of a cross-linking agent including a carboxyl group with respect to 100 parts by weight of the PVA.

The hydrophilic coating composition may include 0.3 to 1 part by weight of PVA as a hydrophilic polymer compound.

Step (2) may include 2-1) treating the fiber web layer with the hydrophilic coating composition, and 2-2) forming the hydrophilic coating layer by heat-treating the fiber web layer treated with the hydrophilic coating composition.

The hydrophilic coating composition may further include a wettability enhancer for improving formability of the hydrophilic coating layer on an outer surface of the nanofiber. The wettability enhancer may include at least one selected from the group consisting of isopropyl alcohol, ethyl alcohol, and methyl alcohol.

The present invention provides a filter module including the filter medium according to the present invention.

According to an exemplary embodiment of the present invention, the filter medium may be provided as a flat membrane or in a bent cylindrical shape.

Advantageous Effects

According to the present invention, flux can be considerably increased due to improved hydrophilicity of a filter medium. Hydrophilicity can be maintained for a long period of time and thus a use cycle can be considerably increased. Furthermore, a change in pore structure of a medium can be minimized in a hydrophilizing process to fully exhibit initially designed physical properties of the medium. Thus, the medium can be variously applied in a water treatment field.

DESCRIPTION OF DRAWINGS

FIGS. 1A and 1B are cross-sectional views illustrating a filter medium according to an exemplary embodiment of the present invention.

FIGS. 2A and 2B are images showing the fiber web layer included in the exemplary embodiment of the present invention.

MODES OF THE INVENTION

Hereinafter, exemplary embodiments of the present invention will be described in detail with reference to the accompanying drawings so as to be easily practiced by a person of ordinary skill in the art. It should be understood that the present invention may be embodied in different ways and is not limited to the following exemplary embodiments. Parts irrelevant to description are omitted in the drawings in order to clearly explain the embodiments of the present invention, and like reference numerals refer to like elements throughout the specification.

Figure 1A:
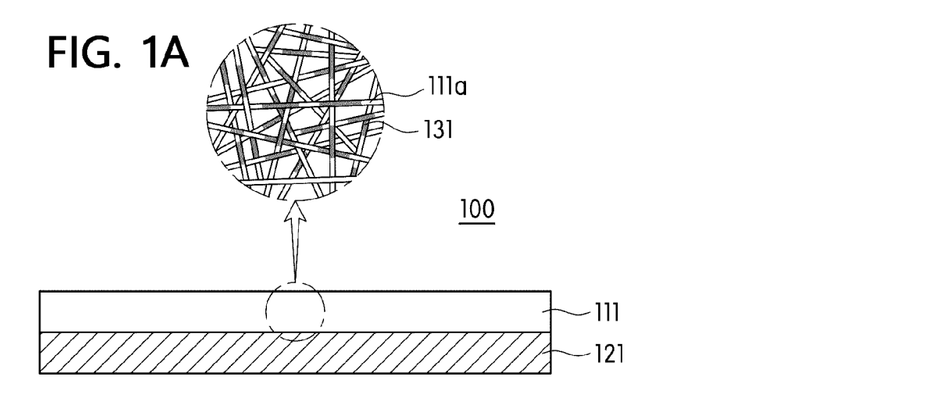
FIG. 1A is a cross-sectional view illustrating a filter assembly and is a partially enlarged schematic view illustrating a fiber web layer.
Figure 1B:
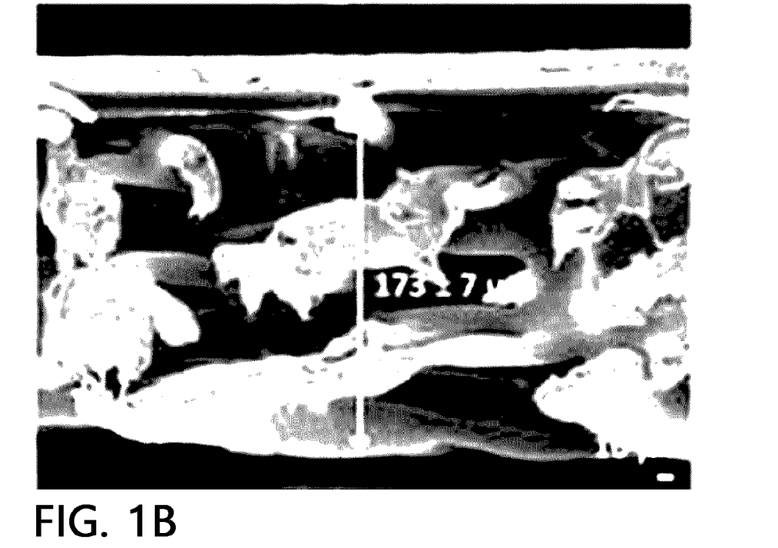
FIG. 1B is a scanning electron microscope (SEM) image showing a cross section of the filter medium.

As shown in FIG. 1, a filter medium 100 according to an exemplary embodiment of the present invention includes a fiber web layer 111 with a three-dimensional network structure and a hydrophilic coating layer 131 configured to cover at least a portion of an outer surface of a nanofiber 111a forming the fiber web layer 111. The filter medium 100 may further include a support body 121 disposed on one surface of the fiber web layer 111.

The support body 121 is a layer which complements the mechanical strength of the fiber web layer 111 including the nanofiber and is not particularly limited as long as it serves as a support body of a filter medium. A shape of the support body 121 may be a shape of a fabric, a knitted fabric, or a nonwoven fabric. The fabric means that a fiber included in the fabric has longitudinal and transverse directionalities. A specific structure of the fabric may be a plain weave, a twilled weave, or the like, and density of warp yarn and weft yarn is not particularly limited. In addition, the knitted fabric may have a known knit structure and may be a weave knitted fabric, a light knitted fabric, or the like, but the present invention is not particularly limited thereto. Furthermore, the nonwoven fabric means that a fiber included in the nonwoven fabric has no longitudinal or transverse directionality. The nonwoven fabric may be a known nonwoven fabric such as a dry nonwoven fabric such as a chemical bonding nonwoven fabric, a thermal bonding nonwoven fabric, or an airlaid nonwoven fabric, a wet nonwoven fabric, a spunless nonwoven fabric, a needle punching nonwoven fabric, or a meltblown nonwoven fabric. The pore diameter, porosity, basis weight, and the like of the nonwoven fabric may be changed according to desired water permeability, filtration efficiency, and mechanical strength, and thus, the present invention is not particularly limited thereto.

A material of the support body 121 is not limited. A non-limiting example of the support body 121 may include a synthetic fiber selected from the group consisting of polyester, polypropylene, nylon, and polyethylene; or a natural fiber including a cellulose-based fiber. However, in order to prevent separation between the support body and the fiber web layer when a water treatment process is performed on a filter medium in order to improve a binding force with the fiber web layer 111 to be described below, and to prevent problems such as a decrease in water permeability, environmental pollution, and pollution of a filtrate according to use of a separate adhesive component, the support body 121 may include a low melting point composite fiber which includes a supporting component and a low melting point component and is disposed such that at least a portion of the low melting point component is exposed at an outer surface thereof. The support body 121 may be thermally fused to the fiber web layer 111 through the low melting point component. The low melting point component may be a known component and may include, for example, a low melting point polymer compound such as low melting point polyester or low melting point polyethylene. More preferably, the low melting point polymer compound may be disposed to be entirely exposed at an outer surface of a fiber. In an example, a fiber forming the support body 121 may include a polyester-based low melting point composite fiber including low melting point polyester as a sheath portion and polyethylene terephthalate as a core portion and/or a polyolefin-based low melting point composite fiber including low melting point polyester as a sheath portion and polypropylene as a core portion. On the other hand, when the polyolefin-based low melting point composite fiber is selected as a composite fiber provided in the support body 121, adhesion with the fiber web layer 111 may be higher. As a result, there is an advantage in that peeling is prevented even when the filter medium flows due to the pressure of raw water introduced into the filter medium. Meanwhile, the low melting point component may have a melting point of 60° C. to 180° C. In addition, the composite fiber forming the support body 121 may have an average diameter of 5 µm to 30 µm Furthermore, a thickness of the support body 121 may be in a range of 0.05 mm to 0.5 mm, for example, 180 µm, but the present invention is not limited thereto. In addition, the support body 121 may have an average pore size of 20 µm to 100 µm and a porosity of 50% to 90%, but the present invention is not limited thereto. There are no restriction on porosity, basis weight, and pore size as long as the support body 121 has a degree of the porosity, basis weight, and pore size so as to support the fiber web layer 111 to be described below to exhibit a desired level of mechanical strength and so as not to inhibit a flow of a filtrate through the fiber web layer 111 or a flow of a coating composition being supplied to the fiber web layer 111.

FIG. 1A illustrates a structure of the filter medium in which one support body 121 is disposed on one surface of the fiber web layer 111. Unlike in FIG. 1A, a filter medium may be implemented to have various structures in which a support body and a fiber web layer are combined so that a support body may be disposed on each of both surfaces of a fiber web layer, a fiber web layer may be disposed on each of both surfaces of a support body, a second support body may be disposed on each of both surfaces of a first support body, and a fiber web layer may be disposed on each of exposed one surfaces of the second support bodies.

Figure 2A:
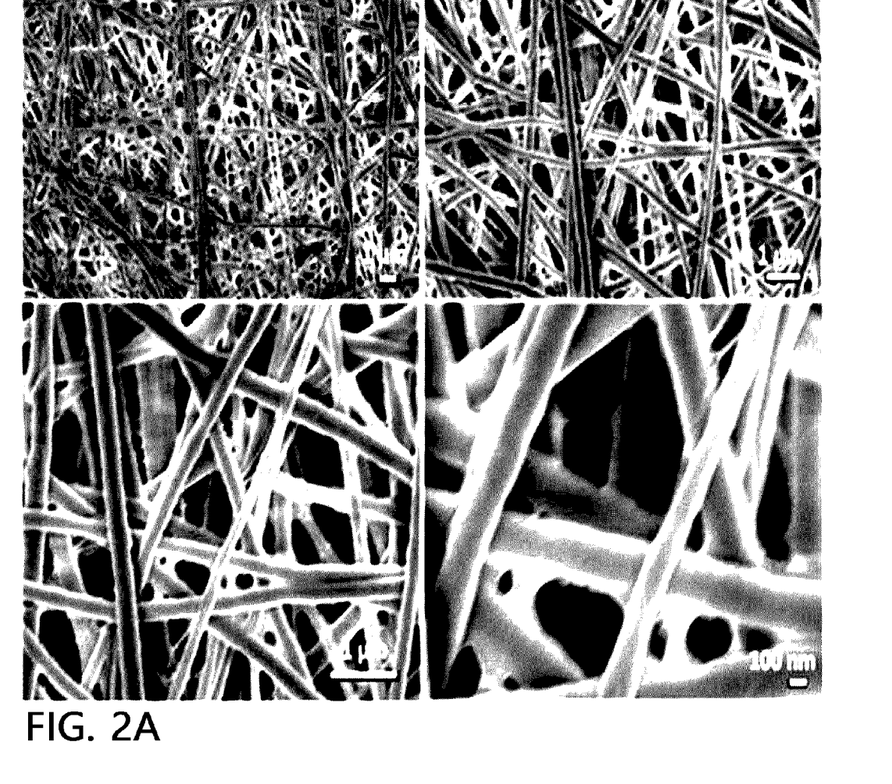
FIG. 2A is a SEM image showing a surface of the fiber web layer.
Figure 2B:
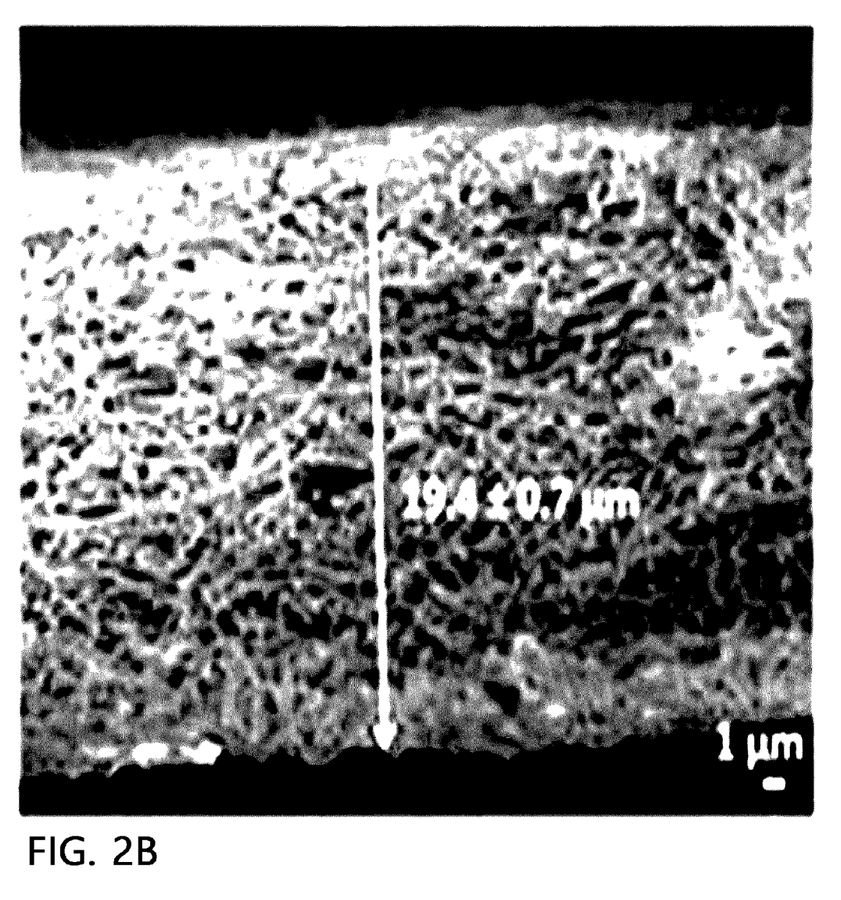
FIG. 2B is a SEM image showing a cross section of the fiber web layer.

As shown in FIGS. 1A, 2A, and 2B, the fiber web layer 111 has a three-dimensional network structure formed to include the nanofiber 111a.

The nanofiber 111a may be a known polymer compound which may be formed to have a fiber shape and may maintain the fiber shape. A non-limiting example of the nanofiber 111a may include at least one selected from polyurethane, polyester, polyolefin, polyamide, a fluorine-based compound, and the like. The nanofiber 111a may include a fluorine-based compound to exhibit more improved chemical resistance and heat resistance. In addition, there is an advantage in that, even when raw water is a strong acid/strong base solution or a high temperature solution, filtration efficiency and flux may be secured to a desired level without changing physical properties of a filter medium. The fluorine-based compound may be used without limitation as long as it is a known fluorine-based compound capable of being formed into a nanofiber. In an example, the fluorine-based compound may include at least one compound selected from the group consisting of polytetrafluoroethylene (PTFE)-based, tetrafluoroethylene-perfluoroalkyl vinyl ether (PFA) copolymer-based, tetrafluoroethylene-hexafluoropropylene (FEP) copolymer-based, tetrafluoroethylene-hexafluoropropylene-perfluoroalkyl vinyl ether copolymer (EPE)-based, tetrafluoroethylene-ethylene (ETFE) copolymer-based, polychlorotrifluoroethylene (PCTFE)-based, chlorotrifluoroethylene-ethylene (ECTFE) copolymer-based, and polyvinylidene fluoride (PVDF)-based compounds. More preferably, the fluorine-based compound may be PVDF in terms of a low production unit cost, ease of mass production of a nanofiber through electrospinning, and high mechanical strength and chemical resistance. In this case, when the nanofiber 111a includes PVDF as a fiber-forming component, a weight average molecular weight of the PVDF may be in a range of 10,000 to 1,000,000, and preferably, in a range of 300,000 to 600,000, but the present invention is not limited thereto.

In addition, the nanofiber 111a may have an average diameter of 0.05 µm to 2 µm and an aspect ratio of 1,000 to 100,000, but the present invention is not limited thereto. The nanofiber 111a provided in the fiber web layer 111 may include 30 to 40 wt % of a first nanofiber group with a diameter of 0.1 µm to 0.2 µm, 50 to 60 wt % of a second nanofiber group with a diameter of 0.2 µm to 0.3 µm, and 5 to 15 wt % of a third nanofiber group with a diameter 0.3 µm to 0.4 µm with respect to the total weight of the fiber web layer 111. In an example, the nanofiber 111a may include 35 wt % of the first nanofiber group, 53 wt % of the second nanofiber group, and 12 wt % of the third nanofiber group with respect to the total weight of the fiber web layer 111. As a result, this may be advantageous for implementing a fiber web layer having a more uniform pore structure.

A thickness of the fiber web layer 111 with the three-dimensional network structure including the nanofiber 111a may be in a range of 0.5 µm to 200 µm, for example, 20 µm. The fiber web layer 111 may have a porosity of 40% to 90%, an average pore size of 0.1 µm to 5 µm, and a basis weight of 0.05 $g/m^2$ to 100 $g/m^2$, but the present invention is not limited thereto. The porosity, the average pore diameter, and the basis weight may be appropriately changed in consideration of desired water permeability and filtration efficiency.

In addition, the fiber web layer 111 may be provided as one or more layers in the filter medium, and the layers of the fiber web layer may differ in porosity, pore size, basis weight and/or thickness.

Next, the hydrophilic coating layer 131 covering at least a portion of the outer surface of the nanofiber 111a will be described.

The nanofiber 111a may have low hydrophilicity according to a selected material. When the nanofiber 111a includes a fluorine-based compound for heat resistance and chemical resistance as described above, hydrophobicity of the nanofiber may become very high, and thus, flux may be considerably decreased with respect to hydrophilic raw water.

On the other hand, in order to solve such a problem, although hydrophilic coating is performed on a surface of a nanofiber including a fluorine-based compound, a hydrophilic material is applied on the hydrophobic surface of the nanofiber. Thus, a coating layer is not formed well. Although the coating layer is formed, the coating layer is easily peeled off, resulting in low durability. In addition, when a hydrophilic coating layer is thickly formed, a pore structure of a fiber web layer may be changed so that initially designed physical properties of the fiber web layer may not be fully exhibited. Furthermore, in order to solve such a problem, in the case of a nanofiber implemented by mixing a hydrophilic component and a fluorine-based compound into a fiber-forming component, miscibility between the compounds is low due to heterogeneous properties. Thus, it is difficult to prepare the nanofiber through electrospinning or it is difficult for the prepared nanofiber to be used in a filter medium due to considerably low mechanical strength of the prepared nanofiber.

Accordingly, in the present invention, the hydrophilic coating layer covering the nanofiber is provided to improve hydrophilicity. The hydrophilic coating layer 131 may be formed to include a hydrophilic polymer including a hydroxy group or may be formed by cross-linking the hydrophilic polymer using a cross-linking agent. In an example, the hydrophilic polymer may be in the form of one or a mixture of polyvinyl alcohol (PVA), ethylenevinyl alcohol (EVOH), sodium alginate, and the like, and most preferably, may be PVA. In addition, the cross-linking agent may be used without limitation as long as the cross-linking agent is a known cross-linking agent including a functional group capable of being cross-linked with the hydroxy group included in the hydrophilic polymer through a condensation reaction or the like. For example, the functional group may be a hydroxy group, a carboxyl group, or the like.

In order to exhibit more improved physical properties, the hydrophilic coating layer 131 may be formed by cross-linking a cross-linking agent including PVA and a carboxyl group. In this case, a polymerization degree of the PVA may be more preferably in a range of 500 to 2,000, and still more preferably, in a range of 1,500 to 2,000, and a saponification degree thereof may be in a range of 85% to 90%. Specifically, a weight average molecular weight of the polyvinyl alcohol may be in a range of 20,000 to 100,000, and more preferably, in a range of 50,000 to 100,000. When the weight average molecular weight of the polyvinyl alcohol is less than 20,000, the formation of a hydrophilic coating layer may not be smooth, or although the hydrophilic coating layer is formed, the hydrophilic coating layer may be easily peeled off, and hydrophilicity may not be improved to a desired level. In addition, when the weight average molecular weight exceeds 100,000, the formation of a hydrophilic coating layer may be excessive. Thus, a pore structure of a fiber web layer may be changed, or pores may be closed. When the saponification degree is less than 85%, the formation of a hydrophilic coating layer may become unstable, and a degree of improvement in hydrophilicity may be insignificant. When the saponification degree exceeds 90%, a hydrogen bond between molecules of the polyvinyl alcohol may be strong. Thus, it may be difficult for the polyvinyl alcohol to be dissolved in a solvent even at high temperature, or although the polyvinyl alcohol is dissolved, it may be difficult for the polyvinyl alcohol to be completely dissolved. As a result, a hydrophilic coating layer may not be properly formed, although the hydrophilic coating layer is formed, the hydrophilic coating layer may be non-uniformly formed, and some pores may be closed. Accordingly, desired effects may not be achieved.

The cross-linking agent may be a component containing a carboxyl group so as to be cross-linked with the above-described polyvinyl alcohol. In an example, the cross-linking agent may include at least one material selected from the group consisting of poly(acrylic acid-maleic acid), a polyacrylic acid, and poly(styrenesulfonic acid-maleic acid). Furthermore, the cross-linking agent may be a polyfunctional cross-linking agent including at least three carboxyl groups so as to be applied very thinly such that coating and adhesive properties of the hydrophilic coating layer formed on the nanofiber and a pore structure of the fiber web layer 111 are not changed even when a surface of the nanofiber 11a has strong hydrophobicity, and so as to concurrently exhibit more improved flux. When the number of the carboxyl groups included in the cross-linking agent is less than 3, it is difficult for a coating layer to be formed on the hydrophobic surface of the nanofiber 111a, and although the coating layer is formed, an adhesion force is very weak so that the coating layer may be easily peeled off. In an example, the cross-linking agent including at least three carboxyl groups may be poly(acrylic acid-maleic acid), and more preferably, be poly(acrylic acid-maleic acid) having a weight average molecular weight of 3,000 to 8,000.

In addition, the hydrophilic coating layer 131 may be formed by cross-linking 5 to 20 parts by weight, more preferably, 10 to 20 parts by weight of a cross-linking agent including a carboxyl group with respect to 100 parts by weight of the above-described polyvinyl alcohol. When the cross-linking agent is included in an amount less than 5 parts by weight, the formability of a hydrophilic coating layer may be decreased, and chemical resistance and mechanical strength may be lowered. In addition, when the cross-linking agent is included in an amount exceeding 20 parts by weight, coagulation between cross-linking agents may be generated in a hydrophilic coating composition, and thus, it may be difficult for a cross-linking reaction to uniformly occur. Therefore, a coating layer may be non-uniformly formed, or flux may be decreased because pores are decreased due to the coating layer.

On the other hand, the hydrophilic coating layer 131 may be formed on a portion of the outer surface of the nanofiber 11a, as shown in FIG. 1A, or may be formed on the whole of the outer surface of the nanofiber unlike in FIG. 1A. Here, the hydrophilic coating layer 131 may be applied on the nanofiber such that the hydrophilic coating layer 131 is included in an amount of 0.1 g to 2 g per unit area (m$^2$) of a fiber web. When the hydrophilic coating layer is applied in an amount less than 0.1 g per unit area (m$^2$) of the fiber web, it may be difficult to obtain a desired level of flux. When the hydrophilic coating layer is applied in an amount exceeding 2 g per unit area (m$^2$) of the fiber web, some pores may be closed to change a pore structure. Thus, a desired filtration rate/flux may not be obtained with an initially designed fiber web layer.

An average value of initial wetting angles may be less than or equal to 40°, more preferably, less than or equal to 30°, still more preferably, less than or equal to 20°, yet still more preferably, less than or equal to 12°, and even more preferably, less than or equal to 5° at any five different points on a surface of the fiber web layer, which is modified and exposed in such a manner that the hydrophilic coating layer 131 is provided on the outer surface of the nanofiber 111a in the fiber web layer 111 of the above-described filter medium 100. As a result, although the fiber web layer is made of a hydrophobic material, an improved flux may be secured. The initial wetting angle means a wetting angle measured within 20 seconds after a droplet is formed on a sample. Due to a porous structure of a fiber web layer, when a droplet initially formed on a surface of the fiber web layer flows through pores, a wetting angle may be decreased. Thus, it is preferable that a degree of surface hydrophilization of the fiber web layer is evaluated at the initial wetting angle. On the other hand, a small change or no change in wetting angle as time passes after the droplet is formed means that the pores in the surface of the fiber web layer are closed due to a hydrophilic modification. As a result, it can be seen that an initially designed pore structure of the fiber web layer is changed due to the hydrophilic modification.

In addition, in the filter medium 100 according to the exemplary embodiment of the present invention, since a degree of hydrophilization is uniform at respective positions of the exposed surface of the fiber web layer 111, an average deviation of the initial wetting angles with respect to the five points at which an average initial wetting angle is measured may be less than or equal to 7°, more preferably, less than or equal to 5°, and still more preferably, less than or equal to 3°. When the average deviation of the initial wetting angles exceeds 7°, among the points of the fiber web layer, there may be a point at which a degree of hydrophilization is low even when an average initial wetting angle is low. Accordingly, the generation of differential pressure may be increased at the point at which the degree of the hydrophilization is low, and a desired level of flux may not be obtained. The average deviation of the initial wetting angles means an average of absolute values of a deviation between an initial wetting angle at each of the five points and an average initial wetting angle which is an arithmetic average of the initial wetting angles at each of the five points. Specifically, the average deviation may be calculated according to Expression 1 below:

$$\text{average deviation (°)} = \left( \sum_{k=1}^{5} \left| \text{average initial wetting angle (°)} - \text{initial wetting angle (°) of point } Xi \right| \right) / 5 \quad \text{[Expression 1]}$$

wherein point Xi refers any one point of 5 different points (X1 to X5) at which an initial wetting angle is measured.

The above-described filter medium 100 may be manufactured through a manufacturing method to be described below, but the present invention is not limited thereto.

The filter medium 100 according to the present invention may be manufactured through a method including (1) forming a fiber web layer having a three-dimensional network structure composed of a nanofiber including a fluorine-based compound on a support body and (2) forming a hydrophilic coating layer by treating the fiber web layer with a hydrophilic coating composition.

First, step (1) will be described. The present step is an step of forming the fiber web layer. A method of providing a nanofiber to form a fiber web layer having a three-dimensional network shape may be used without limitation. The fiber web layer may be formed by electrospinning a spinning solution including a fluorine-based compound on the support body. An example case in which the spinning solution to be described below includes a fluorine-based compound as a fiber-forming component will be described in detail.

The spinning solution may include a fluorine-based compound as a fiber-forming component and a solvent. The fluorine-based compound may be included in an amount of 5 to 30 wt %, preferably, 8 to 20 wt % in the spinning solution. When the fluorine-based compound is included in an amount less than 5 wt %, it may be difficult for the spinning solution to be formed into a fiber, and the spinning solution may not be spun into a fibrous phase and may be spun in a droplet state to form a film phase, or although spinning is performed, many beads may be formed and a solvent may not be volatized easily. Thus, pores may be clogged in a calendering process to be described below. In addition, when the fluorine-based compound is included in an amount exceeding 30 wt %, viscosity is increased to cause solidification on a surface of a solution, and thus, it may be difficult to perform spinning for a long time. In addition, a fiber diameter may be increased, and thus, a fibrous phase with a sub-micrometer size may not be formed.

The solvent may be used without limitation as long as it does not form a precipitate while dissolving the fiber-forming component, i.e., the fluorine-based compound and does not affect spinnability of a nanofiber to be described below. The solvent may include at least one selected from the group consisting of γ-butyrolactone, cyclohexanone, 3-hexanone, 3-heptanone, 3-octanone, N-methylpyrrolidone, dimethylacetamide, dimethyl sulfoxide and dimethylformamide. In an example, the solvent may be a mixed solvent of dimethylacetamide and acetone.

The prepared spinning solution may be prepared into a nanofiber through a known electrospinning device and method. In an example, the electrospinning device may be an electrospinning device including a single spin pack with one spin nozzle or may be an electrospinning device including a plurality of single spin packs or a spin pack with a plurality of nozzles for mass production. In addition, in an electrospinning process, dry spinning or wet spinning with an external coagulation bath may be used, and the method is not limited.

When a stirred spinning solution or a currently stirred spinning solution is introduced into the electrospinning device and is electrospun on a collector such as paper, a desired nanofiber may be obtained. A specific condition for the electrospinning, for example, air pressure of air sprayed through an air spray nozzle provided in a nozzle of a spin pack may be set to a range of 0.01 MPa to 0.2 MPa. When the air pressure is less than 0.01 MPa, the air pressure may not contribute to collection and accumulation of the nanofiber. When the air pressure exceeds 0.2 MPa, a cone of the spin nozzle is hardened to generate blocking of needles, thereby resulting in spinning trouble. In addition, when the spinning solution is spun, an injection rate of the spinning solution per nozzle may be in a range of 10 µl/min to 30 µl/min. Further, a distance between a tip of the nozzle and the collector may be in a range of 10 cm to 30 cm. However, the present invention is not limited thereto, and the injection rate and the distance may be changed according to purpose.

In addition, a nanofiber may be directly electrospun on the above-described support body to directly form a fiber web layer on the support body. The nanofiber accumulated/collected on the support body may have a three-dimensional network structure. Heat and/or pressure are further applied to the accumulated/collected nanofiber so as to have a porosity, pore size, and basis weight suitable for exhibiting desired water permeability and filtration efficiency of a separation membrane, thereby implementing the nanofiber into a fiber web layer having a three-dimensional network structure. A known method may be adapted as a specific method of applying the heat and/or pressure, and as a non-limiting example thereof, a common calendering process may be used. In this case, the applied heat may have a temperature of 70° C. to 190° C. Furthermore, when the calendering process is performed, the calendering process may be performed multiple times. For example, a drying process for removing a solvent and moisture remaining in the nanofiber may be performed through primary calendering, and then, secondary calendering may be performed to control porosity and improve strength. Here, a degree of heat and/or pressure applied in each calendering process may be the same or different.

On the other hand, when the support body is implemented using a low melting point composite fiber, bonding between the fiber web layer and the support body through thermal fusion may be concurrently performed through the calendering process.

In addition, a separate hot melt powder or a hot melt web may be further interposed to bond the support body and the fiber web layer. In this case, temperature of the applied heat may be in a range of 60° C. and 190° C., and the pressure may be applied in a range of 0.1 kgf/cm² to 10 kgf/cm², but the present invention is not limited thereto. Components separately added for the bonding may form a hum or may be dissolved in a water treatment process to cause negative environmental problems so that it is preferable that the support body and the fiber web layer are bonded without adding the components. In an example, the bonding may be performed through a support body composed of a composite fiber including a low melting point component.

Next, as step (2) according to the present invention, an step of forming the hydrophilic coating layer by treating the fiber web layer with the hydrophilic coating composition is performed.

Step (2) may include 2-1) treating the fiber web layer with the hydrophilic coating composition, and 2-2) forming the hydrophilic coating layer by heat-treating the fiber web layer treated with the hydrophilic coating composition.

First, in step 2-1), the hydrophilic coating composition may include a hydrophilic component and a cross-linkable component. The hydrophilic component may be the above-described hydrophilic polymer compound, for example, polyvinyl alcohol. The cross-linkable component may be the above-described cross-linking agent, for example, a cross-linking agent including a carboxyl group.

In addition, the hydrophilic coating composition may further include a solvent capable of dissolving the hydrophilic component and the cross-linkable component, and the solvent may include a known solvent capable of dissolving polyvinyl alcohol, for example, water. The hydrophilic coating composition may include 5 to 20 parts by weight of the cross-linking agent and 1,000 to 100,000 parts by weight of the solvent with respect to 100 parts by weight of the polyvinyl alcohol.

In this case, the polyvinyl alcohol may be preferably included in an amount of 0.3 to 1.0 wt %, more preferably, 0.3 to 0.8 wt % with respect to the total weight of the hydrophilic coating composition. When the polyvinyl alcohol is included in an amount less than 0.3 wt % with respect to the hydrophilic coating composition, the hydrophilic coating layer may be non-uniformly applied or may not be formed to have a desired amount, and thus, an effect of improving hydrophilicity may be insignificant. In addition, when the polyvinyl alcohol is included in an amount exceeding 1.0 wt %, it is difficult to control a thickness of the hydrophilic coating layer, thereby resulting in a change in pore size or a pore closure of the fiber web layer.

On the other hand, due to strong hydrophobicity caused by material properties of the nanofiber forming the formed fiber web layer, although the there is treatment of the hydrophilic coating composition, the coating composition may not permeate into the fiber web layer and may flow along a surface. Thus, it is difficult for the hydrophilic coating composition to reach the nanofiber disposed inside the fiber web layer. In addition, although the hydrophilic coating composition reaches the inside of the fiber web layer, the hydrophilic coating layer may not be properly formed on an outer surface of the nanofiber. In order to improve permeability of the hydrophilic coating composition into the fiber web layer, to wet the permeated hydrophilic coating composition in the outer surface of the nanofiber well, and to rapidly dry the hydrophilic coating composition so as to be applied on the nanofiber before the hydrophilic coating composition flows down, the hydrophilic coating composition may further include a wettability enhancer.

Any component may be used as the wettability enhancer without limitation as long as it may improve the wettability of a hydrophobic outer surface of a nanofiber with respect to a hydrophilic solution and may be easily evaporated and concurrently dissolved in the hydrophilic coating composition. In an example, the wettability enhancer may include at least one component selected from the group consisting of isopropyl alcohol, ethyl alcohol, and methyl alcohol. More preferably, in order to prevent shrinkage of a fiber web layer caused by the evaporation of the wettability enhancer and to prevent a change in initially designed pore structure of the fiber web caused by the shrinkage, the wettability enhancer may include isopropyl alcohol. In addition, the wettability enhancer may be included in an amount of 5,000 to 25,000 parts by weight with respect to 100 parts by weight of the polyvinyl alcohol included in the hydrophilic coating composition. When the wettability enhancer is included in an amount less than 5,000 parts by weight, improvement of the wettability of the nanofiber is insignificant, and thus, the formation of the hydrophilic coating layer may not be smooth, and the hydrophilic coating layer may be frequently peeled off. Furthermore, when the wettability enhancer is included in an amount exceeding 25,000 parts by weight, a degree of improvement of the wettability may be insignificant, and concentrations of the polyvinyl alcohol and the cross-linking agent included in the hydrophilic coating composition are decreased so that the formation of the hydrophilic coating layer may not be smooth.

Meanwhile, a hydrophilic coating layer may be formed by pre-treating the fiber web layer with a wettability enhancer and then treatment with a hydrophilic coating composition without including the wettability enhancer in the hydrophilic coating composition. However, when a fiber web layer in which a wettability enhancer is supported in pores is immersed in a hydrophilic coating composition, a time required for the wettability enhancer supported in the pores to escape from the fiber web layer and for the hydrophilic coating composition to permeate the pores may be long, and thus manufacturing time may be prolonged. In addition, since a degree of permeability of the hydrophilic coating composition differs according to a thickness and a pore size of the fiber web layer, a hydrophilic coating layer may be non-uniformly formed according to positions of a fiber web. Furthermore, as the hydrophilic coating layer is non-uniformly formed, the pores may be clogged in a portion of the fiber web layer by the hydrophilic coating layer. In this case, an initially designed pore structure of the fiber web layer may be changed, and thus, a desired flux may not be obtained. Therefore, it is advantageous to concurrently achieve a reduction in manufacturing time, simplification of a manufacturing process, and improvement in the formability of the hydrophilic coating layer without changing the pore structure of the fiber web layer.

Any known coating method may be used without limitation as a method of forming the above-described hydrophilic coating composition on the fiber web layer, for example, immersion, spraying or the like may be used.

Next, as step 2-2), a step of forming the hydrophilic coating layer by heat-treating the fiber web layer treated with the hydrophilic coating composition may be performed.

Step 2-2) may be performed concurrently with a process of drying a solvent of the hydrophilic coating composition. The heat-treating may be performed in a dryer. In this case, temperature of applied heat may be in a range of 80° C. to 160° C., and a treatment time may be in a range of 1 minute to 60 minutes, but the present invention is not limited thereto.

Figure 5:
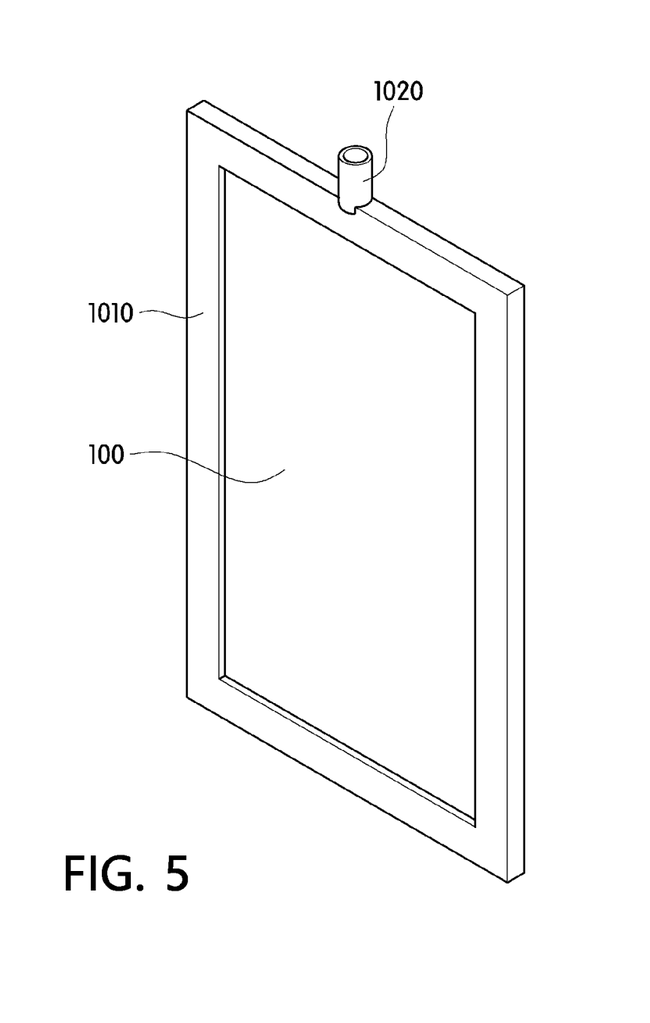
FIG. 5 is a perspective view illustrating a filter module including a filter medium as a flat membrane according to an exemplary embodiment of the present invention.
Figure 6:
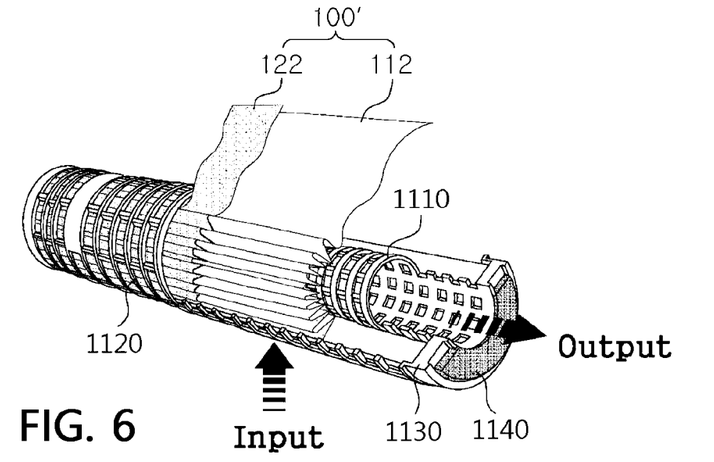
FIG. 6 is an exploded perspective view illustrating a filter module including a filter medium with a bent structure according to an exemplary embodiment of the present invention.

The present invention includes a filter module including the filter medium according to the exemplary embodiment of the present invention manufactured through the above-described manufacturing method. The filter module may further include other components included in a common filter module used for water treatment in addition to the filter medium. For example, the filter module may further include an inner support body such as a porous permeating water outflow pipe which supports or fixes the filter medium and through which a filtrate or a liquid to be filtrated flows, an outer case which houses a heat treatment separation membrane outside thereof, and an end cap which fixes respective assembled components. In this case, a shape in which the filter medium is provided in the filter module may be changed according to a specific water treatment method. For example, the filter medium may be provided in a flat membrane state or may be wound around the inner support body and housed in the outer case. Referring to FIG. 5, the filter medium 100 may be in a flat membrane state and may be fixed to an outer case 1010 capable of supporting four upper, lower, left, and right end portions of the filter medium. An inlet port 1020 may be provided in any one region of the outer case 1010 to allow a pressure difference between the outside and the inside of the filter medium 100. In addition, a filter medium may be wound around an inner porous permeating water outflow pipe 1120, as shown in FIG. 6. In this case, the filter medium 100' may be wound in a bent shape to increase an effective filtration surface area. The filter medium 100' wound around the porous permeating water outflow pipe 1120 may be assembled inside an outer case 1110 and be fixed by an end cap 1130. Furthermore, an O-ring or gasket 1140 to be assembled to a pipe through which filtered permeating water is discharged may be further provided. A filter module like that shown in FIG. 6 is configured such that a liquid to be filtered is introduced into the filter module through a side surface thereof and a filtrate filtered through the filter medium 100' is discharged through the inner porous permeating water outflow pipe 1120.

In addition, a plurality of unit filter modules like those shown in FIGS. 5 and 6 may be provided in one case or one water treatment device to constitute a large water treatment apparatus.

MODE OF THE INVENTION

The present invention will be described in more detail through the following examples, the following examples do not limit the scope of the present invention, and it should be understood that the following examples are intended to assist the understanding of the present invention.

Example 1

Figure 3:
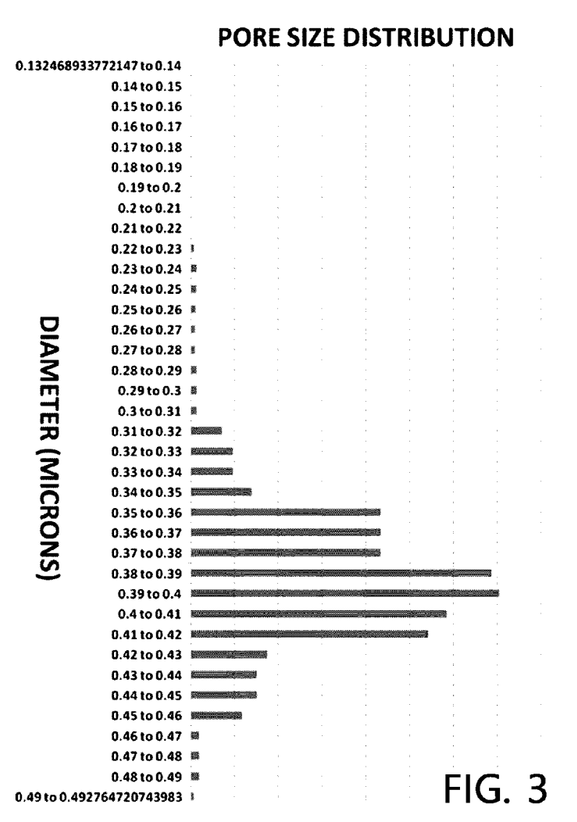
FIG. 3 is a graph showing a pore distribution of the fiber web layer included in the exemplary embodiment of the present invention.
Figure 4:
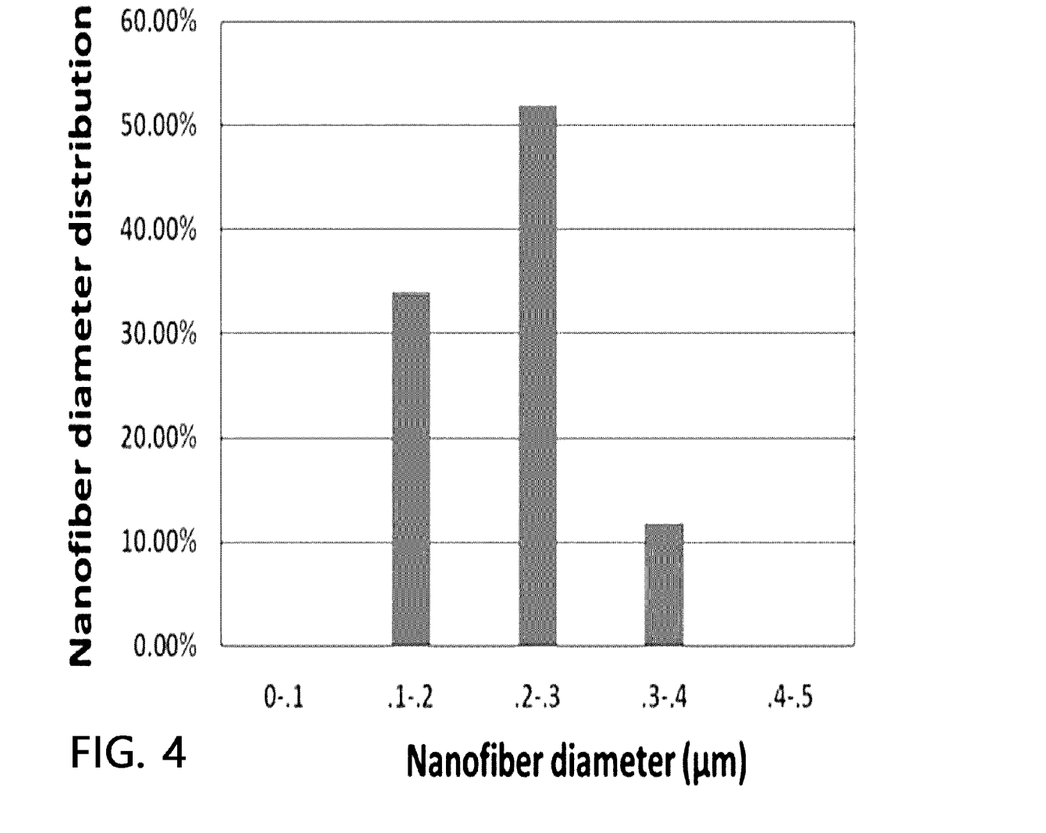
FIG. 4 is a graph showing a diameter distribution of a nanofiber provided in the fiber web layer included in the exemplary embodiment of the present invention.

First, in order to prepare a spinning solution, 12 g of PVDF (Kynar 761 manufactured by Arkema Inc.) as a fiber-forming component was dissolved in 88 g of a mixed solution, which is obtained by mixing dimethylacetamide and acetone in a weight ratio of 70:30, at a temperature of 80° C. for 6 hours using a magnetic bar to prepare a mixed solution. The spinning solution was introduced into a solution tank of an electrospinning device and was ejected at a rate of 15 μl/min/hole. Here, temperature of a spinning section was maintained at 30° C., humidity was maintained at 50%, and a distance between a collector and a tip of a spin nozzle was 20 cm. After that, a voltage of 40 kV or more was applied to a spin nozzle pack using a high voltage generator, and concurrently, an air pressure of 0.03 MPa was applied to each nozzle of the spin pack to form a fiber web layer composed of a PVDF nanofiber. Next, in order to dry a solvent and moisture remaining in the fiber web layer, a calendaring process was performed by applying heat with a temperature of 140° C. and a pressure of 1 kgf/cm². Here, a diameter distribution of a nanofiber of the formed fiber web layer was identical to that shown in FIG. 4, and a pore size distribution of the fiber web layer was identical to that shown in FIG. 3.

The formed fiber web layer was immersed in a hydrophilic coating composition prepared in Preparation Example below and then was dried in a dryer at a temperature of 110° C. for 5 minutes to manufacture a filter medium including a hydrophilic coating layer, as shown in Table 1 below.

<Preparation Example> Hydrophilic Coating Composition 7,142 parts by weight of ultrapure water was mixed with respect to 100 parts by weight of polyvinyl alcohol (PVA217 manufactured by Kuraray Co.) with a saponification degree of 88% and a weight average molecular weight of 75,000 as a hydrophilic component, and then, PVA was dissolved therein at a temperature of 80° C. for 6 hours using a magnetic bar to prepare a mixed solution. The mixed solution was cooled to room temperature, and then, polyacrylic acid-co-maleic acid (PAM manufactured by Sigma-Aldrich Co. LLC) as a cross-linking agent was mixed into the mixed solution such that the polyacrylic acid-co-maleic acid was included in an amount of 15 parts by weight with respect to 100 parts by weight of polyvinyl alcohol, and was dissolved at a temperature of 25° C. for 12 hours. 99.99% isopropyl alcohol (IPA manufactured by Duksan Chemical Co.) was added to the mixed solution such that the isopropyl alcohol was included in an amount of 7,142 parts by weight with respect to 100 parts by weight of the polyvinyl alcohol, and was mixed for 2 hours to prepare a hydrophilic coating layer-forming composition. The polyvinyl alcohol was included in an amount of 0.69 wt % with respect to the total weight of the prepared hydrophilic coating composition.

Examples 2 to 18

A filter medium like that shown in Table 1, 2, or 3 below was manufactured in the same manner as in Example 1, except that a composition and the like of a hydrophilic coating composition was changed as in Table 1, 2, or 3 below.

Comparative Example 1

A filter medium like that shown in Table 3 below was manufactured in the same manner as in Example 1, except that there was no treatment with a hydrophilic coating composition.

Experimental Example 1

The following physical properties of the filter media according to Examples and Comparative Example were evaluated and shown in Tables 1 to 3 below
1. Measurement of Wetting Angle
A contact angle between a surface of a fiber web layer and a surface of a water droplet was measured with a contact angle (°) measuring device in order to measure wettability of the exposed surface of the fiber web layer with respect to water. A method of photographing a shape of a droplet using a charge-coupled device (CCD) camera and then calculating interfacial tension ($\gamma$) optimized for the shape of the finally photographed shape of the droplet was used. An injection volume was set to 0.05 mL through a microsyringe, and secondary distilled water was used. Contact angles were measured at five points on the surface of the fiber web layer within 20 seconds after the droplet was formed, and an average value thereof and an average deviation according to the above-described Expression 1 were calculated.
2. Evaluation of Hydrophilic Coating Layer Amount
A basis weight of a filter medium manufactured before treatment of a hydrophilic coating composition and a basis weight after the hydrophilic coating layer was formed were calculated, and an amount of the hydrophilic coating layer was evaluated with a difference between the basis weights.
3. Measurement of Average Pore Size of Filter Medium
In order to evaluate whether a pore structure of a filter medium is changed after a hydrophilization modification, a pore size distribution after the modification was measured, a porometer manufactured by PMI Company was used, and Galwick was used as a wetting liquid. A measurement result was expressed as an average pore size, and then, an average pore size of each of the filter media according to Examples was expressed as a relative percentage with respect to 100% of an average pore size of the filter medium of Comparative Example 1. It can be expected that, as an average pore size deviates from 100%, an initially designed pore structure of a fiber web is changed due to the formation of a hydrophilic coating layer.

Experimental Example 2

After a non-woven fabric (CCP40 manufactured by Namyang Nonwoven Fabric Co., Ltd,) composed of a low melting point composite fiber with a thickness of 200 μm and a melting point of about 120° C. including polyethylene as a sheath portion and polypropylene as a core portion, that is, a support body is disposed on one surface of the fiber web layers according to Examples and Comparative Example, a calendering process was performed by applying heat with a temperature of 140° C. and a pressure of 1 kgf/cm$^2$, thereby preparing filter medium specimens including the support body. Each of the prepared specimens was implemented as a flat membrane module shown in FIG. 5, and then, an step pressure of 50 kPa was applied to measure water permeability per a specimen area of 0.5 m$^2$. Water permeability of each of the filter media according to the remaining Examples and Comparative Example 1 was relatively shown in Tables 1 to 3 with respect to 100% of water permeability of the filter medium according to Example 1.

TABLE 1

|  |  |  | Example 1 | Example 2 | Example 3 | Example 4 | Example 5 | Example 6 | Example 7 |
|---|---|---|---|---|---|---|---|---|---|
| Hydrophilic coating composition | PVA | Weight average molecular weight | 75,000 | 75,000 | 75,000 | 75,000 | 75,000 | 75,000 | 75,000 |
|  |  | Saponification degree | 88 | 88 | 88 | 88 | 88 | 88 | 88 |
|  |  | Amount (wt %) | 0.69 | 0.15 | 0.23 | 0.32 | 0.78 | 0.83 | 1.1 |

TABLE 1-continued

|  |  |  | Example 1 | Example 2 | Example 3 | Example 4 | Example 5 | Example 6 | Example 7 |
|---|---|---|---|---|---|---|---|---|---|
|  | Cross-linking agent | Number of carboxyl groups | 3 | 3 | 3 | 3 | 3 | 3 | 3 |
|  |  | Amount (parts by weight) | 15 | 15 | 15 | 15 | 15 | 15 | 15 |
|  | Wettability enhancer | Type | IPA | IPA | IPA | IPA | IPA | IPA | IPA |
|  |  | Amount (parts by weight) | 7,142 | 7,142 | 7,142 | 7,142 | 7,142 | 7,142 | 7,142 |
| Filter medium | Amount of hydrophilic coating layer (g/m$^2$) |  | 0.81 | 0.22 | 0.37 | 0.71 | 0.88 | 0.98 | 1.21 |
|  | Average wetting angle (°) |  | 25 | 83 | 72 | 38 | 25 | 23 | 24 |
|  | Average deviation of wetting angle (°) |  | 1.1 | 17.5 | 14.7 | 4.8 | 0.9 | 0.7 | 0.7 |
|  | Relative average pore size (%) |  | 100 | 100 | 100 | 100 | 98 | 93 | 80 |
|  | Relative water permeability (%) |  | 100 | 29 | 40 | 86 | 94 | 86 | 76 |

TABLE 2

|  |  |  | Example 8 | Example 9 | Example 10 | Example 11 | Example 12 | Example 13 |
|---|---|---|---|---|---|---|---|---|
| Hydrophilic coating composition | PVA | Weight average molecular weight | 75,000 | 75,000 | 75,000 | 75,000 | 75,000 | 75,000 |
|  |  | Saponification degree | 88 | 88 | 88 | 88 | 88 | 88 |
|  |  | Amount (wt %) | 0.69 | 0.69 | 0.69 | 0.69 | 0.69 | 0.69 |
|  | Cross-linking agent | Number of carboxyl groups | 3 | 3 | 3 | 3 | 3 | 3 |
|  |  | Amount (parts by weight) | 1 | 3 | 8 | 11 | 19 | 22 |
|  | Wettability enhancer | Type | IPA | IPA | IPA | IPA | IPA | IPA |
|  |  | Amount (parts by weight) | 7,142 | 7,142 | 7,142 | 7,142 | 7,142 | 7,142 |
| Filter medium | Amount of hydrophilic coating layer (g/m$^2$) |  | 0.11 | 0.18 | 0.65 | 0.79 | 1.2 | 0.44 |
|  | Average wetting angle (°) |  | 108 | 92 | 40 | 28 | 17 | 61 |
|  | Average deviation of wetting angle (°) |  | 2.4 | 15.8 | 6.9 | 3.6 | 4.7 | 13.1 |
|  | Relative average pore size (%) |  | 100 | 100 | 100 | 100 | 84 | 63 |
|  | Relative water permeability (%) |  | 0 | 22 | 82 | 94 | 81 | 51 |
| Filter medium | Amount of hydrophilic coating layer (g/m$^2$) |  | 0.11 | 0.18 | 0.65 | 0.79 | 1.2 | 0.44 |
|  | Average wetting angle (°) |  | 108 | 92 | 40 | 28 | 17 | 61 |
|  | Average deviation of wetting angle (°) |  | 2.4 | 15.8 | 6.9 | 3.6 | 4.7 | 13.1 |
|  | Relative average pore size (%) |  | 100 | 100 | 100 | 100 | 84 | 63 |
|  | Relative water permeability (%) |  | 0 | 22 | 82 | 94 | 81 | 51 |

TABLE 3

|  |  |  | Example 14 | Example 15 | Example 16 | Example 17 | Example 18 | Comparative Example 1 |
|---|---|---|---|---|---|---|---|---|
| Hydrophilic coating composition | PVA | Weight average molecular weight | 10,000 | 150,000 | 75,000 | 75,000 | 75,000 | — |
|  |  | Saponification degree | 86 | 92 | 88 | 88 | 88 | — |

TABLE 3-continued

|  |  |  | Example 14 | Example 15 | Example 16 | Example 17 | Example 18 | Comparative Example 1 |
|---|---|---|---|---|---|---|---|---|
|  |  | Amount (wt %) | 0.69 | 0.69 | 0.69 | 0.69 | 0.69 | — |
|  | Cross-linking agent | Number of carboxyl groups | 3 | 3 | 3 | 3 | 3 | — |
|  |  | Amount (parts by weight) | 15 | 15 | 15 | 15 | 15 | — |
|  | Wettability enhancer | Type | IPA | IPA | — | IPA | EtOH | — |
|  |  | Amount (parts by weight) | 7,142 | 7,142 | 0 | 4,000 | 7,142 | — |
| Filter medium |  | Amount of hydrophilic coating layer (g/m$^2$) | 0.41 | 2.06 | 0.26 | 0.71 | 0.80 | 0 |
|  |  | Average wetting angle (°) | 66 | 23 | 84 | 37 | 26 | 110 |
|  |  | Average deviation of wetting angle (°) | 2.1 | 1.7 | 13.1 | 0.9 | 1.1 | 1.3 |
|  |  | Relative average pore size (%) | 100 | 51 | 100 | 100 | 93 | 100 |
|  |  | Relative water permeability (%) | 53 | 44 | 29 | 88 | 91 | 0 |

As can be seen from Tables 1 to 3, the filter medium including a PVDF fiber web according to Comparative Example 1, in which a hydrophilic coating layer was not formed, had strong hydrophobicity, and thus, it can be confirmed that water permeability was measured to be zero.

Among Examples, it can also be confirmed that the degree and uniformity of a formed hydrophilic coating layer were changed according to an amount of PVA in a hydrophilic coating composition, a weight average molecular weight of the PVA, and/or an amount of a cross-linking agent. In the case of some Examples, it can be confirmed that an initially designed pore structure of the filter media was not maintained as an average pore size is decreased, as compared with the filter medium of Comparative Example 1.

Furthermore, it can be confirmed that the degree of formation of a hydrophilic coating layer or the average pore size of an implemented filter medium was changed according to an the amount and type of a wettability enhancer, which influences water permeability of an implemented filter media.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

The invention claimed is:

1. A filter medium for water treatment comprising:
a fiber web layer which has a three-dimensional network structure including a nanofiber; and
a hydrophilic coating layer which covers at least a portion of an outer surface of the nanofiber,
wherein the hydrophilic coating layer comprises a cross-linked product of a hydrophilic coating composition comprising a hydrophilic polymer compound including a hydroxy group and a cross-linking agent including a carboxyl group,
wherein an average initial wetting angle of a water droplet is less than or equal to 40° and an average deviation of an initial wetting angle is less than or equal to 7° at any five different points on an exposed surface of the fiber web layer.

2. The filter medium for water treatment of claim 1, further comprising a support body disposed on at least one surface of the fiber web layer.

3. The filter medium for water treatment of claim 2, wherein the support body includes a composite fiber which includes a support component and a low melting point component and is disposed such that the at least a portion of the low melting point component is exposed at an outer surface thereof, and the low melting point component of the composite fiber is thermally fused to a fiber web.

4. The filter medium for water treatment of claim 1, wherein the nanofiber includes at least one fluorine-based compound selected from the group consisting of polytetrafluoroethylene (PTFE)-based, tetrafluoroethylene-perfluoroalkyl vinyl ether (PFA) copolymer-based, tetrafluoroethylene-hexafluoropropylene (FEP) copolymer-based, tetrafluoroethylene-hexafluoropropylene-perfluoroalkyl vinyl ether copolymer (EPE)-based, tetrafluoroethylene-ethylene (ETFE) copolymer-based, polychlorotrifluoroethylene (PCTFE)-based, chlorotrifluoroethylene-ethylene (ECTFE) copolymer-based, and polyvinylidene fluoride (PVDF)-based compounds.

5. The filter medium for water treatment of claim 1, wherein the fiber web layer has an average pore size of 0.1 μm to 5 μm and a porosity of 40% to 90%.

6. The filter medium for water treatment of claim 1, wherein the nanofiber has a diameter of 0.05 μm to 2 μm.

7. The filter medium for water treatment of claim 1, wherein the cross-linking agent includes at least three carboxyl groups.

8. The filter medium for water treatment of claim 1, wherein the hydrophilic polymer compound includes polyvinyl alcohol having a weight average molecular weight of 20,000 to 100,000 and a saponification degree of 85% to 90%.

9. The filter medium for water treatment of claim 1 wherein the hydrophilic coating layer covers the nanofiber so as to be included in an amount of 0.1 g to 2 g per unit area (m$^2$) of a fiber web layer.

10. The filter medium for water treatment of claim 1, wherein the hydrophilic polymer compound is polyvinyl alcohol, and the hydrophilic coating layer includes 5 to 20 parts by weight of the cross-linking agent with respect to 100 parts by weight of the polyvinyl alcohol.

11. A filter module comprising the filter medium according to claim 1.

12. The filter module of claim 11, wherein the filter medium is provided as a flat membrane or in a bent cylindrical shape.

13. The filter medium for water treatment of claim 1, wherein the hydrophilic coating composition further includes a wettability enhancer.

14. The filter medium for water treatment of claim 1, wherein the wettability enhancer includes isopropyl alcohol, ethyl alcohol, methyl alcohol, or a combination thereof.

15. A method of manufacturing a filter medium for water treatment, the method comprising:
(1) forming a fiber web layer with a three-dimensional network structure including a nanofiber; and
(2) forming a hydrophilic coating layer by treating the fiber web layer with a hydrophilic coating composition,
wherein the hydrophilic coating layer comprises a cross-linked product of a hydrophilic coating composition comprising a hydrophilic polymer compound including a hydroxy group and a cross-linking agent including a carboxyl group,
wherein an average initial wetting angle of a water droplet is less than or equal to 40° and an average deviation of an initial wetting angle is less than or equal to 7° at any five different points on an exposed surface of the fiber web layer.

16. The method of claim 15, wherein the fiber web layer of step (1) is formed by electrospinning a spinning solution on a support body.

17. The method of claim 16, further comprising thermally fusing the support body and the fiber web layer by applying any one or more of heat and pressure to the stacked support body and fiber web layer.

18. The method of claim 16, wherein the hydrophilic coating composition further includes a wettability enhancer for improving formability of the hydrophilic coating layer with respect to an outer surface of the nanofiber,
wherein the wettability enhancer includes at least one selected from the group consisting of isopropyl alcohol, ethyl alcohol, and methyl alcohol.

19. The method of claim 15, wherein the hydrophilic coating composition includes polyvinyl alcohol (PVA) as a hydrophilic polymer compound and includes 5 to 20 parts by weight of a cross-linking agent including a carboxyl group with respect to 100 parts by weight of the polyvinyl alcohol.

20. The method of claim 15, wherein the hydrophilic coating composition includes 0.3 to 1 part by weight of polyvinyl alcohol (PVA) as a hydrophilic polymer compound.

* * * * *